Nov. 22, 1927.  
C. D. STONEHAM  
1,649,870  
APPARATUS FOR PREDICTING THE MOVEMENTS OF MOVING BODIES  
Filed Feb. 23, 1923  
4 Sheets-Sheet 2
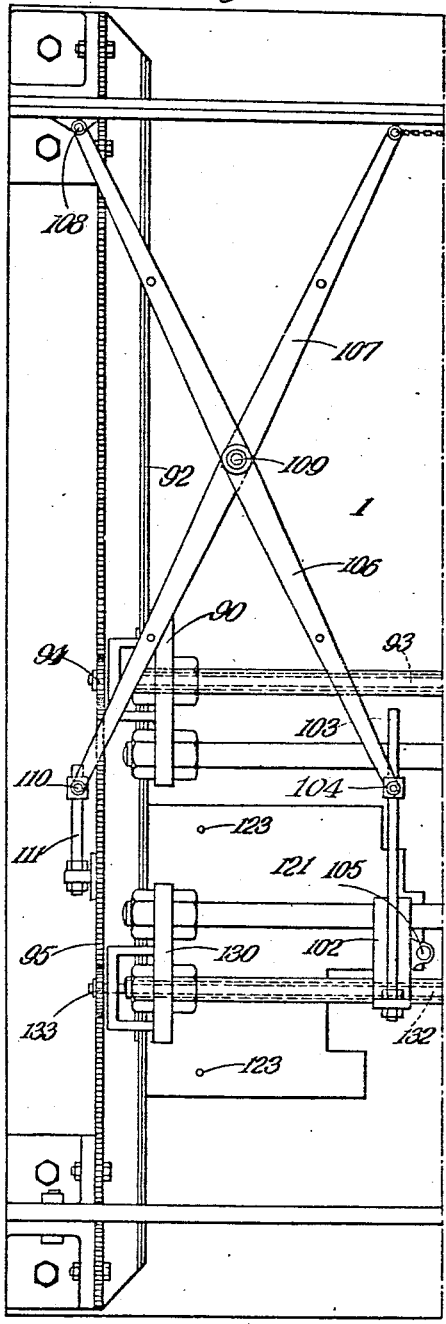
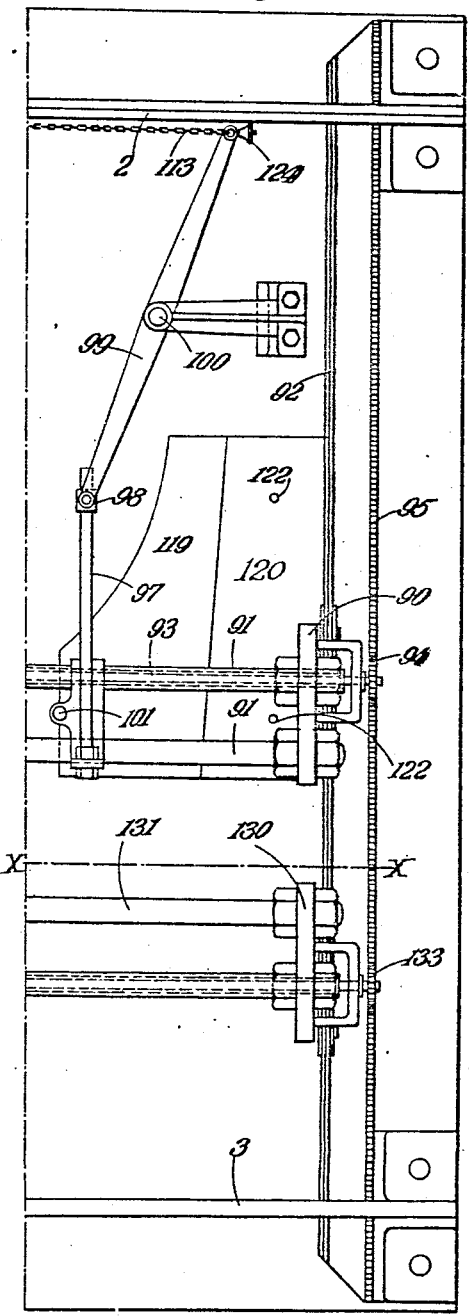

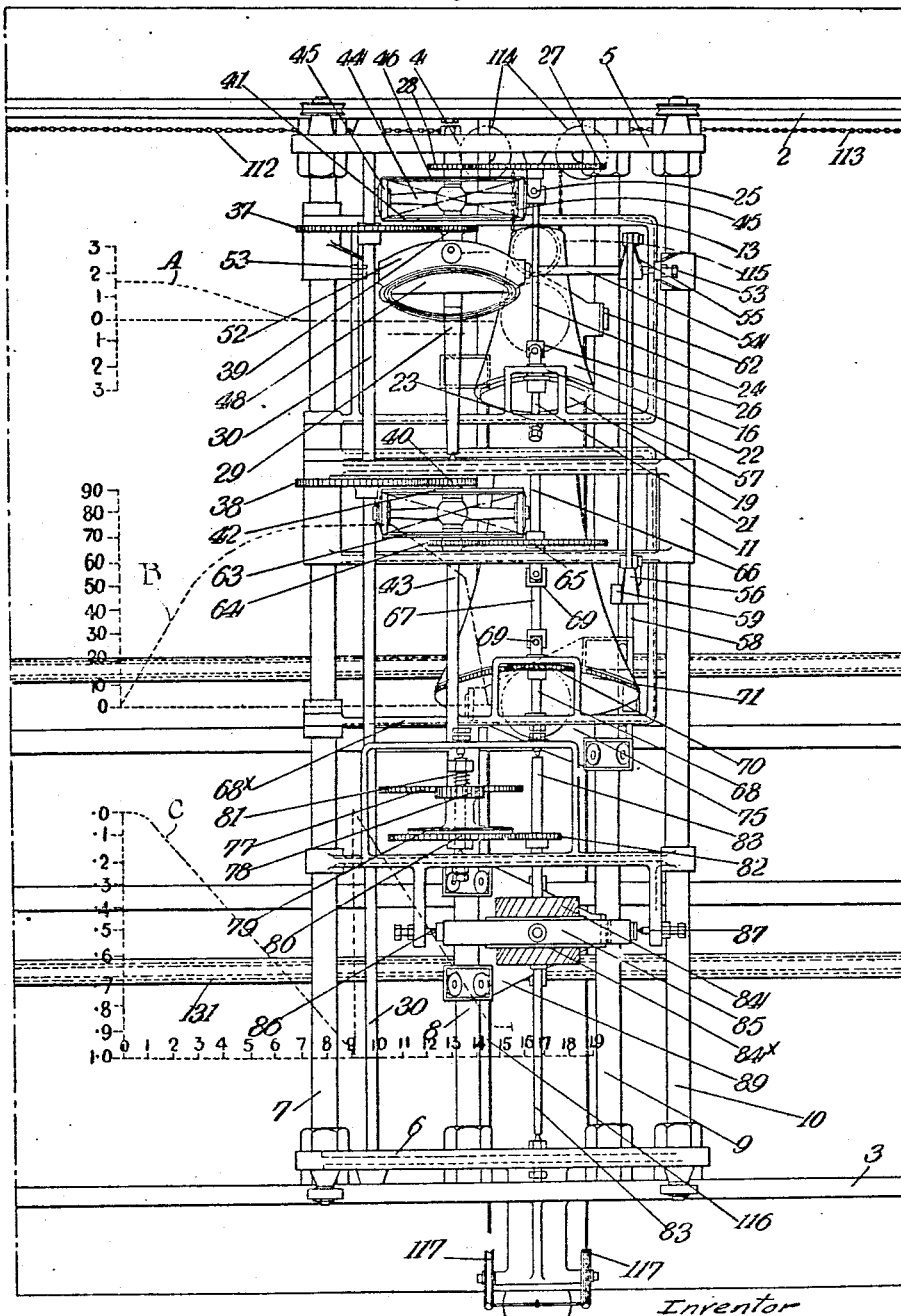

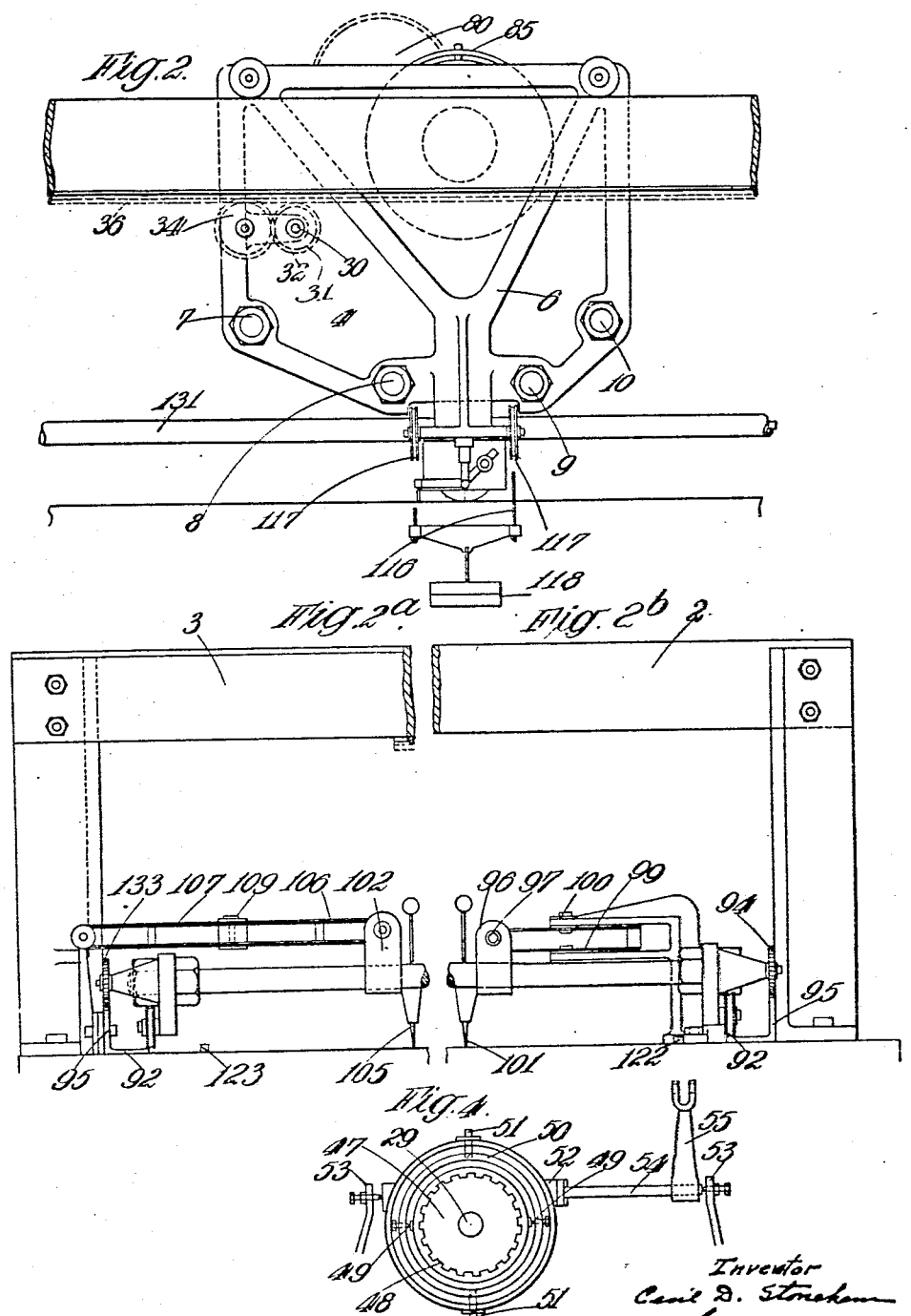

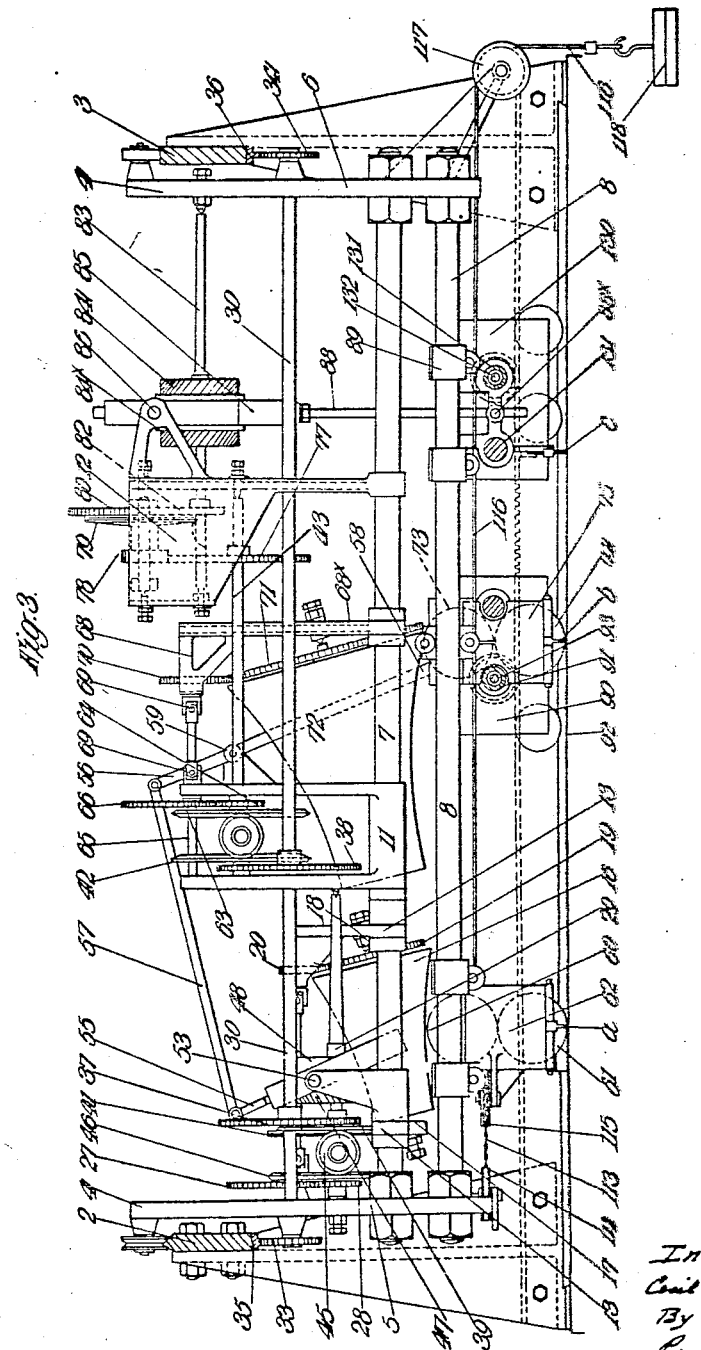

Patented Nov. 22, 1927.

1,649,870

UNITED STATES PATENT OFFICE.

CECIL DEACON STONEHAM, OF LEWISHAM, ENGLAND.

APPARATUS FOR PREDICTING THE MOVEMENTS OF MOVING BODIES.

Application filed February 23, 1923, Serial No. 620,718, and in Great Britain April 20, 1922.

This invention relates to apparatus for predicting the movements of railway vehicles (particularly electrically propelled vehicles), road vehicles and other moving bodies under the combined action of propulsive power, gravity and/or other forces and has for its chief object to obviate the greater part of the laborious calculations heretofore necessary in drawing figures or curves representing the behaviour of a body as regards acceleration, speed and distance covered with respect to elapsed time from the commencement of movement of the body. Examples of the other bodies referred to are ships, aeroplanes and colliery pit cages or elevators.

According to the invention the apparatus is provided with means which when adjusted or moved in accordance with the measured, calculated or assumed forces producing accelerations or with the measured, calculated or assumed accelerations of the body under the influence of the forces acting thereon (e. g. the forces or accelerations produced by one or more engines or motors and/or by frictional or other resistances, and the forces or acceleration produced by the forces at different points in the travel of the body by gravity due to gradients in the case of a railway or road vehicle and by friction due to curvatures of the rail road or the nature of the road surface) will cause curves to be traced representing to suitable scales the behaviour of the body as regards acceleration, speed and distances covered (or any of these factors) with respect to elapsed time. It is convenient for the purpose of the invention to arrange for the said means or parts of the apparatus to be adjusted in accordance with the said measured, calculated or assumed accelerations and this is readily accomplished having regard to the fact that accelerations are directly proportional to the forces producing them. The said means may comprise a member movable (preferably against a suitably shaped template) in accordance with the accelerations at different speeds as aforesaid and another member movable (also preferably against a suitably shaped template) in accordance with the accelerations at different points in the travel as aforesaid; the movements of these two members are mechanically added together and a movement equal or proportional to the sum of the movements is imparted to the carrier or container of the primary element of a variable speed mechanism mounted on a travelling carriage which is caused to move at a suitable or constant speed and in so doing to also rotate the said primary element at a suitable or constant speed. The movement of the said carrier or container is caused to trace a curve representing the acceleration with respect to elapsed time. The movements derived from the variable speed mechanism are, by means of a suitable device (a differential gear for example), combined with movements obtained by the travel of the carriage and the resultant movement is imparted to the carrier or container of the primary element of a second variable speed mechanism also mounted on the said travelling carriage, the second-mentioned primary element being caused to rotate by the movement of the said carriage. The movement of the second-mentioned carrier or container is caused to trace a curve representing the speed of the moving body with respect to elapsed time and is also caused to automatically effect the displacement for speed of the aforesaid member movable in accordance with accelerations at different speeds. The movements derived from the second-mentioned variable speed mechanism are, by means of a suitable device (a differential gear for example) combined with movements obtained by the travel of the carriage and the resultant movement is imparted to a sub-carriage mounted on the travelling carriage. The movement of this sub-carriage is caused to trace a curve representing the distance travelled by the moving body with respect to elapsed time and is also caused to automatically effect the displacement for distance of the aforesaid member movable in accordance with accelerations at different points in the travel of the body.

The invention will be better understood by referring to the accompanying drawings, which illustrate by way of example the preferred embodiment of my invention. In these drawings—

Figs. 1, 1ᵃ and 1ᵇ are associated views, Fig. 1 showing the traveling carriage at the central portion of the apparatus. Fig. 1ᵃ is a plan view of the end of the apparatus at the left of Fig. 1, the intermediate portion of the apparatus between these two figures being broken away. Fig. 1ᵇ is a plan view of the end of the apparatus at the right of Fig. 1, the intermediate portion of the apparatus being similarly broken away.

Figs. 2, 2ª and 2ᵇ are also associated views. Fig. 2 is a view in side elevation of the apparatus shown in Fig. 1, and thus looking at the end of the traveling carriage. Fig. 2ª is a view in side elevation of the end of the apparatus at the left of Fig. 2ª, and thus it is a view in side elevation of Fig. 1ª. Fig. 2ᵇ is a view of the end of the apparatus at the right of Fig. 2, and is a sectional view on the line X—X of Fig. 1ᵇ.

Fig. 3 is a view partly in end elevation and partly in section of the apparatus shown in Fig. 1; and Fig. 4 is an enlarged view of a portion of the apparatus shown in the preceding figures.

1 represents a table supporting at a suitable height above it two guide rails 2 and 3 on which the travelling carriage 4 travels. This travelling carriage comprises end members 5 and 6, longitudinal rods 7, 8, 9 and 10 connecting these end members together and intermediate connecting frames 11 and 12 carried by the rods 7 and 10. The said end members 5 and 6 support a shaft 30 having toothed wheels 31 and 32 meshing respectively with other toothed wheels 33 and 34 which in turn mesh with toothed racks 35 and 36 (Figure 3) one at each side of the carriage 4 so that when the latter is moved along the guide rails 2 and 3 the shaft 30 is rotated. The said shaft carries other toothed wheels 37 and 38 which mesh with toothed wheels 39 and 40 rigidly connected to bevel wheels 41 and 42 forming elements of the aforesaid differential gears which will be hereinafter fully described.

On the said travelling carriage is mounted a frame 13 which supports a drum 16 rotatably mounted in bearings or pivots 17 and 18 (Figure 3). This drum rests on a sphere 60 resting on another sphere 61 which in turn rests on the table 1. The said spheres are supported in the said relative position, whilst being free to rotate in all directions, by a container 62 adapted to travel on the aforesaid rods 8 and 9 so that the upper sphere may be under one end or the other of the drum 16 or at any intermediate position subject to a controlling action subsequently to be described. The extent of the travel of the said container 62 between its extreme positions under the ends of the drum 16 is hereinafter referred to as its permitted travel. The said frame is loosely pivoted on the rod 7 to allow the said drum 16 to always remain in contact with the upper sphere 60 at all points in the permitted travel of the container 62. If the travelling carriage be moved along its guides 2 and 3 (carrying with it the container 62 with the spheres 60 and 61, and the frame 13 with the drum 16) the lower sphere 61 will roll on the table 1 and its rotation will be transmitted to the upper sphere 60 which will in turn transmit rotational movement to the drum 16 by friction, and the angular rotation of the said drum will be proportional to the motion of the travelling carriage 4 and inversely proportional to the diameter of the drum 16 at the part where for the time being it rests on the upper sphere 60.

The drum 16 has at one end a toothed wheel 19 meshing with a second toothed wheel 20 secured to a shaft 21 which is carried in bearings 22 and 23 on the frame 13. This shaft is connected by another shaft 24 and universal joints 25 and 26 to a toothed wheel 27 which is mounted in the end member 5 of the travelling carriage 4. This toothed wheel meshes with and drives a toothed wheel 28 to which is rigidly attached a bevel wheel 46 which thus rotates in amount proportional to the angular rotation of the drum 16 and consequently proportionally to the movement of the travelling carriage 4 and inversely as the diameter of the drum 16. This bevel wheel 46 forms an element of the first-mentioned differential gear and is arranged co-axially with but independently of the other bevel wheel 41 appertaining to this differential gear and connected by planet wheels 45, 45 carried by spigots 44, 44 on a shaft 29 on which the said bevel wheels are rotatably mounted. The angular rotation of this shaft (which is rotatably carried by the end member 5 and the intermediate frame 11) is thus equal to half the algebraic sum of the angular rotations of the said bevel wheels. The said shaft has mounted on it a cylindrical member 47 having a screw thread formed on its periphery. A nut 48 engages the screw thread on the member 47 and is supported in trunnions or bearings 49 in a ring 50 which has projections 51, 51 sliding in suitable guides in a second ring 52. The latter ring with an extension piece 54 is supported in bearings 53, 53 disposed in a plane which does not contain the axis of the shaft 29. The said extension piece 54 carries a lever 55 which is connected by a link 57 to another lever 56 mounted in a bearing 59. On rotation of the shaft 29 in the manner above described, the nut 48 is constrained to move axially relatively to the said shaft and in so doing it will rock or rotate the ring 52 and the second-mentioned lever 56 by an amount which will be a measure of the algebraic sum of the angular rotations of the aforesaid bevel wheels 41 and 46. An extension 58 on the second-mentioned lever 56 passes through a swivelling guide piece suitably attached to a container 75 which is free to move under the control of the said extension along guides in a similar manner to the first-mentioned container 62.

For a certain suitable number of teeth in the several toothed wheels and bevel wheels above described and for a certain diameter of one portion of the drum 16 it will result that when the upper sphere 60 is in contact with the drum at that diameter the angular rotation of the bevel wheel 46 driven thereby is of equal amount, but opposite in direction to the angular rotation of the other bevel wheel 41 of the differential gear. I prefer to arrange for this condition to exist when the sphere 60 is at or near the mid-point of its permitted travel and consequently when this condition is fulfilled the lever 56 and its extension 58 will not be rocked. This position of the sphere 60 in relation to the drum 16 is hereinafter referred to as the neutral position. Furthermore, when the sphere 60 is displaced from the said neutral position, the shaft 29 driven by the differential gear will be rotated through a certain angle when the travelling carriage 4 is moved along its guide rails 2 and 3, the angle depending on the extent of the motion of the said carriage. I so fashion the drum 16 that for the same amount of travel of the carriage 4 the total angle through which the said shaft 29 will turn is greater by equal increments for successive equal increments of displacement of the sphere 60 from the said neutral position, the turning of the shaft 29 being in one direction or the other according to whether the displacement of the sphere 60 is on one side or the other of the aforesaid neutral position.

Another shaft 43 is rotated in a similar manner by the differential rotation of bevel wheels 42 and 63 appertaining to the aforesaid second differential gear, the bevel wheel 42 being rotated by the movement of the travelling carriage 4 as aforesaid. The other bevel wheel 63 is attached to a toothed wheel 64 which meshes with a toothed wheel 65 attached to a shaft 66. This shaft is rotatably mounted in the aforesaid intermediate frame 11 and is connected by a shaft 67 and universal joints 69, 69 to another shaft 68 carried by a frame 68× pivotally mounted on the guide 7. The free end of the shaft 68 carries a toothed wheel 70 which meshes with a toothed wheel 71 secured to a second drum 72 mounted to rotate in the said pivoted frame 68×. The said second drum 72 rests on and is driven by a sphere 73 resting upon a second sphere 74 in contact with the table in a similar manner to that hereinbefore described with reference to the drum 16 and the spheres 60 and 61. The spheres 73 and 74 are carried by the aforesaid container 75 which can move from end to end of the drum in a similar manner to the other container 62. The drum 72 is so fashioned and the number of teeth in the toothed driving wheels 38, 40, 64 and 65 are so selected that when the spheres 73 and 74 are under one end of the drum the shaft 43 driven by the second differential gear will not be rotated when the travelling carriage 4 is moved along its guide rails 2 and 3; this end of the drum is hereinafter referred to as the neutral end of the drum. For equal successive increments of displacement of the spheres from the said end the shaft 43 will be given angular rotation progressively larger by equal angular increments for movements of the travelling carriage 4 of equal amount along its guide rail.

The shaft 43 carries a toothed wheel 77 meshing with another toothed wheel 78 integral with a friction clutch member 79 which bears on and drives a further toothed wheel 80 by means of a frictional surface thereon, the said clutch member 79 being held in engagement by a spring 81. The toothed wheel 80 meshes with a toothed wheel 82 carried by a shaft 83 which is mounted to rotate in the aforesaid intermediate member 12. This shaft carries a cylindrical member 84 formed with a screw thread on its periphery. Engaging with this screw thread is a nut 84× which is constrained to move axially and by an arrangement similar to that previously described with reference to the nut 48 rocks a pivoted ring 85 about pivots 86 and 87 carried by the member 12. This ring is provided with an extension 88 which passes through a suitable guide block mounted in trunnions or the like 88× (Figure 3) on a sub-carriage 89 which is thus caused to move along the rods 8 and 9 arranged transversely to the guide rails 2 and 3 for the travelling carriage 4. The direction of motion of the sub-carriage 89 depends on the direction of rotation of the last-mentioned cylindrical member 84 and consequently on the relative amount of the angular rotation of the bevel wheels 42 and 63 of the second differential gear.

Another carriage composed of end members 90, 90 and longitudinal connecting members 91, 91 runs on transverse guide rails 92, 92 and has a shaft 93 with toothed wheels 94, 94 engaging with fixed transverse toothed racks 95, 95. The longitudinal members 91, 91 of the latter carriage (which is hereinafter referred to as the speed carriage) pass through suitable housings in the second-mentioned container 75 in such manner that when this container is moved through some part of its permitted travel the speed carriage is constrained to move with it (keeping always parallel to itself by virtue of the action of the toothed wheels 94, 94, the shaft 93 and the toothed racks 95, 95) but not otherwise. The said longitudinal members 91, 91 carry a slider 96 having a guide-piece 97 on which slides a guide block 98 attached to one end of a lever 99 pivoted at 100 to a bracket carried by the table 1. This slider has a needle 101 adapted to move with it and to follow the contour of a template 119 hereinafter referred to as the motor-characteristic template or alternatively to follow the contour of another template 120 hereinafter referred to as the braking template or of still another template (not shown) hereinafter referred to as the coasting template.

Another carriage, hereinafter referred to as the distance carriage, is carried by the sub-carriage 89. This distance carriage comprises end members 130 and longitudinal connecting members 131, 131 and runs on the aforesaid transverse guide rails 92, 92. The said distance carriage has a shaft 132 provided with toothed wheels 133 engaging with the aforesaid transverse toothed racks 95, 95. These longitudinal members 131, 131 carry a slider 102 having a needle 105 adapted to follow the contour of a template 121 hereinafter referred to as the road template. A guide 103 on this slider slidably engages a guide block 104 attached to one end of a lever 106 the other end of which is pivoted at 108 to a fixed part. This lever is pivoted at or near its centre by a pivot 109 to another lever 107 one arm of which is attached to a guide block 110 adapted to slide on a fixed guide piece 111. A chain or cord 112, 113 connects the other arm of the last-mentioned lever to the free arm of the lever 99 appertaining to the motor-characteristic template 119 and this chain or cord passes round guide pulleys 114, 114 on the end member 5 of the travelling carriage 4 and around a guide pulley 115 on the first-mentioned container 62. Means such as a screw and nut 124 are provided for adjusting the length of the cord or chain 112, 113. Other cords or chains 116, 116 attached to the said container 62 pass over guide pulleys 117, 117 carried by the other end member 6 of the travelling carriage 4 and support a counterweight 118.

The motor-characteristic template 119 is fashioned to correspond with the known or assumed characteristics of the engine, motor or the like under investigation, so that ordinates represent to scale the speed of the train or other vehicle, and abscissæ represent (to twice the scale for which the machine is designed to draw the curves connecting speed and time) the calculated, measured or assumed acceleration of the vehicle under the action of the combined force produced by the engine or motor and frictional resistances and the like at each and all speeds. Similarly the braking template 120 is made to represent to the same scales as the motor-characteristic template, the negative acceleration produced by the action of the brakes or the like at each and all speeds of the vehicle. In addition to these two templates another may be provided representing to the same scales the negative acceleration produced by frictional and other resistances when the vehicle is coasting. These templates are removably positioned on the table 1 by studs 122 which project upwards and engage in holes in the templates.

The road template 121 is fashioned so that the abscissæ represent to the same scale as the motor-characteristic template 119, the positive or negative accelerations of the vehicle at every point in its path produced by the force of gravity, by the friction due to curves or by other forces which are a function of the path of the vehicle. The ordinates represent to the chosen scale, distances from some selected point in the path of the vehicle. This template is also removably positioned on the table 1 by studs 123.

It will be seen that the first-mentioned container 62 is moved under the action of its counter-weight 118 and the path of the needles 101 and 105 which follow the contour of the motor-characteristic template 119 and the road template 121 (or the braking or the coasting template and the the road template as the case may be) so that its displacement from the neutral position is equal to half the algebraic sum of the abscissæ of the road template 121 on the one hand and the motor-characteristic template 119 (or the braking or the coasting template) on the other hand. Its displacement is therefore proportional to the algebraic sum of the accelerations which would be produced in the vehicle by each of the forces acting alone, so that its displacement is proportional to what the actual acceleration of the vehicle would be under the stated conditions. The displacement of the travelling carriage 4 represents (to the scale of the curves which the apparatus is designed to produce) elapsed time from the commencement of movement of the vehicle the motion of which is under investigation. It will therefore be seen that the movement of the said container 62 is two-fold, motion in one direction representing to scale, as ordinates, the acceleration of the vehicle, and motion in the other direction representing to scale, as abscissæ, the time elapsing from the commencement of motion of the vehicle; hence its path is a figure which represents the acceleration of the vehicle with respect to elapsed time and which is hereinafter referred to as the acceleration—time curve of the vehicle.

It will further be seen that the first-mentioned drum 16, the spheres 60 and 61 appertaining thereto, the second-mentioned container 75 and the mechanism disposed between the latter and the said drum constitute an integrating apparatus in which the displacement of the said container (carrying with it the speed carriage) from its position at the neutral end of the drum 72 is proportional to the integrated area of the plane figure bounded by the path of the first-mentioned container 62 and the path which it would describe if it travelled throughout at the said neutral end of the said drum. Further, since the integrated area of the aforesaid acceleration-time curve represents speed with respect to time, it will be seen that the path described by the second-mentioned container 75 traces in similar manner a figure of which the ordinates represent to scale the speed of the vehicle and the abscissæ represent to scale elapsed time.

The second-mentioned drum 72, the spheres 73 and 74 appertaining thereto, the aforesaid sub-carriage 89 and the mechanism disposed between the latter and this drum similarly constitute an integrating apparatus in which the displacement of the sub-carriage (carrying with it the distance carriage) represents to scale the integrated area of the plane figure bounded by the path followed by the second-mentioned container 75, hereinafter referred to as the speed-time curve of the vehicle, and the path which it would follow if it were not displaced from its position at the neutral end of the said drum, and since the integrated area of the figure bounded by the speed-time curve with respect to time gives the relation of distance covered to time, it follows that the sub-carriage 89 describes a path which is a plane figure and in which the ordinates represent to scale the distance through which the vehicle would move whilst under the action of the said forces and the abscissæ represent to scale the elapsed time from the commencement of the acceleration of the vehicle. The path of the sub-carriage 89 is hereinafter referred to as the distance-time curve of the vehicle.

The aforesaid containers 62 and 75 and the sub-carriage 89 carry or control pens, pencils or the like $a$, $b$, $c$ which trace out on a sheet of paper or other suitable material mounted on the table 1 the various plane figures or curves above referred to as the acceleration-time curve, the speed-time curve, and the distance-time curve typical examples of which are indicated at A, B and C in Figure 1. The graduations appertaining to the curve A represent positive and negative accelerations in miles per hour per second for example and those appertaining to the curve B represent speed in miles per hour for example. The ordinate graduations appertaining to the curve C represent the distance travelled by the vehicle (in tenths of a mile for example) and the abscissa graduations represent the elapsed time. It will be observed that the road template 121 corresponds to the road characteristics of a relatively small portion (one mile for example) of the line over which the vehicle is to run. Thus when the pointer 105 has reached the end of this template and the curve C has in consequence reached the abscissa line, the apparatus is stopped, the next succeeding road characteristic template is placed in position in substitution for the previous one, the sub-carriage 89 is moved by hand to bring the pointer 105 into the required commencing position of the new template and the apparatus is started again, the pencil $c$ then tracing another curve which is, in effect, a continuation of the curve previously traced. The said manual movement of the sub-carriage is permitted to occur by reason of the aforesaid friction clutch device between the shaft 43 and the cylindrical member 84, which clutch device is disengaged by hand and the wheel 82 on the spindle 83 (or the wheel 80 meshing with the wheel 82) then revolved by hand to bring the sub-carriage 89 back to its initial position by the action of the screw-threaded drum 84 and its associated parts. In this position the clutch device is released and the apparatus is then ready to trace another curve C as aforesaid. In the depicted typical examples of the curves A, B and C, the first portions of these curves correspond to the acceleration period after the starting of a railway train from rest, the next portions to running at constant speed, the following portions to coasting and the final portions to braking in bringing the train to rest.

It will be understood that at the commencement of an operation the travelling carriage 4 is placed at the left hand end of its travel. The apparatus is then actuated by moving the carriage toward the right, either manually or by means of a falling weight, a small electric motor, or by any other suitable agency. The container 75 and the sub-carriage 89 are adjusted so that their recording pencils $b$ and $c$ lie on the abscissæ of the curves B and C, corresponding to the zero of the respective figured scales. In the case of the container 75, this location corresponds to the neutral end of the drum 72 as hereinbefore described. The aforesaid speed carriage with the needle 101 and the distance carriage with the needle 105 will of course conform in position to the position of the container 75 and the sub-carriage 89 respectively. The position of the container 62 at the commencement of an operation will depend upon the value of the difference of the abscissæ of the road template 121 on the one hand and of the abscissæ of the motor characteristic (or braking or coasting) template on the other, and further when the abscissæ are equal and consequently their difference zero in value, the container 62 will take up the aforesaid mid or neutral position and under this condition its pencil $a$ will lie on the abscissæ of the curve A. The action of the weight 118 will cause the needle 101 to keep in contact with the template 119 or 120, but in regard to the needle 105, this would be adjusted by the operator in charge of the apparatus so that it follows the path defined by the template 121.

What I claim and desire to secure by Letters Patent of the United States is:—

1. An apparatus for predicting the movements of railway vehicles, road vehicles and other moving bodies, comprising in combination means representing measured, calculated or assumed forces acting on, or accelerations of, said body, co-operating means movable under the control of said represenative means, members actuated by said co-operating means, the resulting motion of said members representing to scale at least one of the quantities acceleration, speed and distance covered relevant to said body, a member movable to represent elapsed time and means for combining the movement of said member with the movement of at least one of said first mentioned members.

2. An apparatus for predicting the movements of railway vehicles, road vehicles and other moving bodies, comprising in combination a member movable in accordance with the accelerations of the body at different speeds, another member movable in accordance with the accelerations of the body at different points in its travel, means for mechanically adding together the movements of these members, a third member to which a movement equal or proportional to the sum is imparted by the last-mentioned means and a carriage supporting said third member and movable to represent elapsed time, said third member producing a curve representing the acceleration of the body with respect to elapsed time.

3. An apparatus for predicting the movements of railway vehicles, road vehicles and other moving bodies, comprising in combination a member movable in accordance with the accelerations of the body at different speeds, another member movable in accordance with the accelerations of the body at different points in its travel, means for mechanically adding together the movements of these members, a travelling carriage, a variable speed mechanism on said carriage, a driving member associated with said mechanism, means whereby said driving member is rotated by movement of said carriage, a carrier for said driving member, a tracer on said carrier and means whereby said carrier is moved an amount proportional to the sum of the movements of said first mentioned members.

4. An apparatus for predicting the movements of railway vehicles, road vehicles and other moving bodies, comprising in combination a member movable in accordance with the accelerations of the body at different speeds, another member movable in accordance with the accelerations of the body at different points in its travel, means for mechanically adding together the movements of these members, a travelling carriage, a variable speed mechanism on said carriage, a driving member associated with said mechanism, means whereby said driving member is rotated by movement of said carriage, a carrier for said driving member, a tracer on said carrier, means whereby said carrier is moved an amount proportional to the sum of the movements of said first mentioned members, and means for combining the movement derived from said variable speed mechanism with the movement of said carriage and for imparting the resultant movement to a member producing a curve representing the speed of the moving body with respect to elapsed time.

5. An apparatus for predicting the movements of railway vehicles, road vehicles and other moving bodies, comprising in combination a member movable in accordance with the accelerations of the body at different speeds, another member movable in accordance with the accelerations of the body at different points in its travel, means for mechanically adding together the movements of these members, a travelling carriage, a variable speed mechanism on said carriage, a driving member associated with said mechanism, means whereby said driving member is rotated by movement of said carriage, a carrier for said driving member, a tracer on said carrier, means whereby said carrier is moved an amount proportional to the sum of the movement of said first mentioned member, means for combining the movement derived from said variable speed mechanism with the movement of said carriage, a second variable speed mechanism, a driving member associated with said mechanism, means whereby said driving member is rotated by movement of said carriage, a carrier for said driving member, a tracer on said carrier and means for imparting said combined movement to said second mentioned carrier.

6. An apparatus for predicting the movements of railway vehicles, road vehicles and other moving bodies, comprising in combination a member movable in accordance with the accelerations of the body at different speeds, another member movable in accordance with the accelerations of the body at different points in its travel, means for mechanically adding together the movements of these members, a travelling carriage, a variable speed mechanism on said carriage, a driving member associated with said mechanism, means whereby said driving member is rotated by movement of said carriage, a carrier for said driving member, a tracer on said carrier, means whereby said carrier is moved an amount proportional to the sum of the movement of said first mentioned members, means for combining the movement derived from said variable speed mechanism with the movement of said carriage, a second variable speed mechanism, a driving member associated with said mechanism, means whereby said driving member is rotated by movement of said carriage, a carrier for said driving member, a tracer on said carrier, means for imparting said combined movement to said second mentioned carrier and means for combining the movement derived from said second mentioned variable speed mechanism with the movement of said carriage and for imparting the resultant movement to a member producing a curve representing the distance travelled by the moving body with respect to elapsed time.

7. An apparatus for predicting the movement of railway vehicles, road vehicles, and other moving bodies, comprising in combination a member movable in accordance with the accelerations of the body at different speeds, another member movable in accordance with the accelerations of the body at different points in its travel, means for mechanically adding together the movements of these members, a travelling carriage, a variable speed mechanism on said carriage, a driving member associated with said mechanism, means whereby said driving member is rotated by movement of said carriage, a carrier for said driving member, a tracer on said carrier, means whereby said carrier is moved an amount proportional to the sum of the movement of said first mentioned members, means for combining the movement derived from said variable speed mechanism with the movement of said carriage and for imparting the resultant movement to a member producing a curve representing the speed of the moving body with respect to elapsed time, and means for causing the movement of said curve-producing member automatically to effect the displacement for speed of said member movable in accordance with the acceleration of the body at different speeds.

8. An apparatus for predicting the movements of railway vehicles, road vehicles and other moving bodies, comprising in combination a member movable in accordance with the accelerations of the body at different speeds, another member movable in accordance with the accelerations of the body at different points in its travel, means for mechanically adding together the movements of these members, a travelling carriage, a variable speed mechanism on said carriage, a driving member associated with said mechanism, means whereby said driving member is rotated by movement of said carriage, a carrier for said driving member, means whereby said carrier is moved an amount proportional to the sum of the movement of said first mentioned members, means for combining the movement derived from said variable speed mechanism with the movement of said carriage, a second variable speed mechanism, a driving member associated with said mechanism, means whereby said driving member is rotated by movement of said carriage, a carrier for said. driving member, a tracer on said carrier, means for imparting said combined movement to said second mentioned carrier, means for combining the movement derived from said second mentioned variable speed mechanism with the movement of said carriage and for imparting the resultant movement to a member producing a curve representing the distance travelled by the moving body with respect to elapsed time, and means for causing the movement of said curve-producing member automatically to effect the displacement for distance of said member movable in accordance with the accelerations of the body at different points in its travel.

CECIL DEACON STONEHAM.